United States Patent [19]

Sunada et al.

[11] 4,284,525

[45] Aug. 18, 1981

[54] TITANIUM TRICHLORIDE CATALYTIC COMPONENT AND METHOD FOR HOMO- OF CO-POLYMERIZATION OF α-OLEFIN

[75] Inventors: Yoichi Sunada, Shinnanyo; Yoshikazu Takahashi, Hikari; Masaru Takitani, Shinnanyo, all of Japan

[73] Assignee: Toyo Stauffer Chemical Co., Ltd., Tokyo, Japan

[21] Appl. No.: 106,243

[22] Filed: Dec. 21, 1979

[30] Foreign Application Priority Data

Nov. 26, 1979 [JP] Japan .................... 54-152818

[51] Int. Cl.$^3$ .................................. C08F 4/64
[52] U.S. Cl. ........................... 252/429 B; 526/142
[58] Field of Search ............................ 252/429 B

[56] References Cited

U.S. PATENT DOCUMENTS 4,192,774  3/1980  Kortbeek et al. ............ 252/429 B

FOREIGN PATENT DOCUMENTS

| | | |
|---|---|---|
| 51-76196 | 7/1976 | Japan . |
| 51-90998 | 8/1976 | Japan . |
| 51-94496 | 8/1976 | Japan . |
| 52-47594 | 4/1977 | Japan . |
| 52-115797 | 9/1977 | Japan . |
| 53-12796 | 2/1978 | Japan . |
| 54-90094 | 7/1979 | Japan . |

*Primary Examiner*—Patrick Garvin
*Attorney, Agent, or Firm*—Armstrong, Nikaido, Marmelstein & Kubovcik

[57] ABSTRACT

A titanium tirchloride catalytic component obtained by separating it out of a solution consisting of titanium tetrachloride, an organic ether compound and an organo-aluminum compound dissolved in a solvent. The solvent is a mixture consisting of a saturated aliphatic hydrocarbon and/or an alicyclic hydrocarbon with 20 to 70% by volume of a concomitant aromatic hydrocarbon halide included therein. The organo-aluminum compound, the titanium tetrachloride and the organic ether compound are added to this mixed solvent at a solvent temperature not exceeding 55° C.

Following this, on the way of a process for raising the solvent temperature to 45°–150° C. a temporary cooling process was repeated twice or more than twice, in the cooling process of which the solvent is temporarily cooled to a temperature lower than 40° C. and at the time of this cooling the organic ether compound and/or titanium tetrachloride is further added, to obtain thereby a titanium trichloride catalytic component having average particle diameter between 10 and 1000μ. Then homo- or co-polymerization of α-olefin is carried out by using a catalyst system comprising this catalytic component and an organo-aluminum compound.

11 Claims, No Drawings

TITANIUM TRICHLORIDE CATALYTIC COMPONENT AND METHOD FOR HOMO- OF CO-POLYMERIZATION OF α-OLEFIN

BACKGROUND OF THE INVENTION

This invention relates to a titanium trichloride catalytic component of high activity advantageously usable in the manufacture of a highly stereospecific α-olefin polymer and also relates to a method for homo- or co-polymerization of an α-olefin which is carried out in the presence of this catalytic component and an organo-aluminum compound to obtain a highly stereo-specific polymer.

More specifically stated, this invention relates to an α-olefin polymerizing titanium trichloride catalytic component obtained in such a manner that, in having a titanium trichloride catalytic component separated from a solution prepared by dissolving titanium tetrachloride, an organic ether compound and an organo-aluminum compound in a solvent, the solvent is a mixed solvent which is prepared by allowing 20 to 70% by volume of an aromatic hydrocarbon halide to be concomitant in a mixed solvent consisting of a saturated aliphatic hydrocarbon and/or an alicyclic hydrocarbon; the organo-aluminum compound, the titanium tetrachloride and the organic ether compound are added to the mixed solvent at a solvent temperature not exceeding 55° C.; following this adding, on the way of a process for raising the solvent temperature to 45°–150° C. a temporary cooling process was repeated twice or more than twice, in the cooling process of which the solvent is temporarily cooled to a temperature lower than 40° C. when the temperature thereof reaches 45°–80° C. and at the time of this cooling the organic ether compound and/or the titanium tetrachloride is further added, thus to have an α-olefin polymerizing titanium catalytic component of average particle diameter 10 to 1000μ separated out, and also relates to a method for homo- or co-polymerization of α-olefin which is carried out in the presence of a catalyst system comprising this titanium trichloride catalytic component and an organo-aluminum compound.

An important feature of the invention lies in that the average particle diameter of the titanium trichloride catalystic component which is separated out in accordance with this invention is adjustable within a wide range from 10 to 1000μ as desired and that the catalytic component thus obtained has highly uniform particle diameter and is highly active when it is used for the polymerization of α-olefin. In addition to these advantages, a polymer of extremetly uniform particle diameter can be obtained by carrying out homo- or co-polymerization of α-olefin with a catalyst system which is prepared using this catalytic component in combination with an organo-aluminum compound; and, in accordance with the invented method, the deashing process and the washing process which are normally considered indispensable for the manufacture of an olefin polymer can be either omitted or simplified. Further, in accordance with this invention, a pelletizing process also can be omitted.

DESCRIPTION OF THE PRIOR ART

A catalytic component to be used for polymerization of α-olefin these days is required to have a sufficiently high polymerizing activity to obviate the necessity of the deashing and washing processes for removal of a catalyst residue and non-stereospecific polymer from the polymer produced; to have a high productivity for a stereospecific polymer; to ensure that the catalystic component and the polymer produced therefrom have a suitable particle diameter; and to have a uniform particle size. The reason for such requirements lies in the fact that the catalytic components and the polymer products that are obtained by the conventional methods in a powdery state have uneven particle size and this has been making separation, drying and transportation of them difficult. This has been causing troubles in manufacturing operations and thus has been lowering the industrial productivity of them.

Further, it is also desired that a catalytic component for such a purpose permits omission of a pelletizing process in the manufacture of an α-olefin polymer.

In an α-olefin polymer manufacturing plant using a titanium trichloride catalytic component which is obtained by a conventional method, a powdery polymer obtained through a polymerization process is dried; then, the dried polymer has to be pelletized through melting, kneading and molding before it is shipped as polymer ploduct for use in molding processes. At such an α-olefin polymer manufacturing plant, the pelletizing process has been requiring the largest portion of the cost of facilities and also consumes a large amount of energy. If it is possible to prepare a catalytic component that permits the manufacture of a polymer which is highly homogeneous in particle diameter distribution including no minute polymer particles therein, it not only enhances the operation efficiency of the polymer manufacturing plant but also the troublesome process of pelletizing the polymer product can be omitted. Then, this would save a large amount of cost of facilites and energy consumption and would greatly contribute to the rationalization of the polymer manufacturing process. Therefore, development of such an ideal catalytic component has been strongly desired.

For polymerization of α-olefin, Ziegler-Natta catalysts have heretofore been employed in general. A typical example of such catalysts is a catalyst system consisting of a combination of the δ-type titanium trichloride-aluminum chloride eutectic mixture (hereinafter will be called a δ-type eutectic mixture) and an organo-aluminum compound. The δ-type eutectic mixture is obtained by pulverizing and activating, in accordance with a known method using a ball mill or a viabration mill or the like, a γ-type titanium trichloride-aluminum chloride eutectic mixture (hereinafter will be called the γ-type eutectic mixture) which is obtained by reducing titanium tetrachloride with aluminum powder in the presence of aluminum chloride. However, with the δ-type eutectic mixture employed as catalytic component for α-olefin polymerization, polymerization activity and the productivity for a stereospecific polymer are low and not satisfactory. Nowadays, there have been proposed many methods for reformation of the γ or δ-type eutectic mixture including for example: (1) A method of co-pulverizing the δ-type eutectic mixture or the γ-type eutectic mixture and a reforming agent such as an electron donor compound or allowing them to react upon each other. (2) A method of washing the γ-type or δ-type eutectic mixture with an inert hydrocarbon solvent. (3) A method of heating the γ-type or δ-type eutectic mixture.

These reformation or denaturation methods improve the polymerization activity of the catalytic component and the productivity for a stereospecific polymer to a certain degree. These methods, however, are utterly incapable of permitting control over the particle diameter of the catalytic component and also are far from meeting the requirement of obviating the necessity of the deashing and washing processes.

Further, recently, there have been developed some catalytic components which have a high polymerizing activity and ensure a high degree of productivity for a stereospecific polymer. In an example of the methods for obtaining such a catalytic component (disclosed by a Japanese patent application laid-open No. 47-34478), (1) a $\beta$-type titanium trichloride-aluminum chloride eutectic mixture (hereinafter will be called the $\beta$-type eutectic mixture) is prepared by reducing titanium tetrachloride with an organo-aluminum compound at a low temperature; (2) the $\beta$-type eutectic mixture is treated with a complex-making agent to remove a portion of the aluminum component in the $\beta$-type eutectic mixture; and then (3) it is heat treated in titanium tetrachloride to obtain a $\delta$-type eutectic mixture presenting a dark purple color. The catalytic component is excellent having a high degree of polymerizing activity which is several times greater than that of the catalytic component of the $\delta$-type eutectic mixture which is obtained by the above stated pulverization process. However, this method of manufacturing a catalytic component has the following drawbacks: (1) A long period of time is required for the manufacture. (2) It requires a large quantity of a washing liquid for washing the catalytic component. (3) It produces a large quantity of waste liquid containing titanium ion and aluminum ion. (4) Therefore, it necessitates the use of a large quantity of neutralizing reagent and thus requires a large quantity of neutralizing reagent and thus requires a large amount of energy for prevention of environmental pollution and for recovery of the solvent used. Accordingly, this results in a very high cost of manufacture of the catalytic component.

To eliminate the above stated drawbacks, there have been proposed improved methods for the manufacture of a catalytic component. These improved methods include: (1) A method in which a liquid matter obtained by treating titanium tetrachloride, in the presence of an organic ether compound, with an organo-aluminum compound expressed by a generic formula of $AlR_nX_{3-n}$ (wherein R represents an alkyl group having a carbon number 1 to 10; X a halogen atom; and n a real number of $0 < n \leq 3$) is brought into contact with a liberating agent such as Lewis acid at a temperature not exceeding 150° C. to have a titanium trichloride catalyltic component separated out in a fine powdery state (Japanese patent applications laid-open Nos. 51-16298 and 51-76196). (2) An improvement over the above stated method (1) in which the liberating agent is not used (Japanese patent appl. laid-open No. 52 47594). (3) A method in which a titanium trichloride catalytic component is allowed to separate out by using seed crystals in carrying out the above stated method (1) (Japanese patent appl. laid-open No. 51-94496). (4) A method in which a titanium trichloride catalytic component is allowed to separate out by varying the operation temperature in carrying out the above stated method (1) (Japanese patent appl. laid-open No. 51-90998). Each of these catalytic component manufacturing methods doesn't require the use of a solvent in large quantity and, accordingly, produces a waste liquid in small quantity. Each of them, however, has a drawback in that: The average particle diameter of the titanium trichloride chatalytic component obtained by the method is at the most about 30$\mu$ and normally measures only several $\mu$ and that bulk density thereof is too small for easy handling. Further, when the catalytic component is used for $\alpha$-olefin polymerization, the particle diameter and the bulk density of the polymer product thus obtained are small and the productivity of a stereospecific polymer is low. Besides, since the polymer product thus obtained is in a powdery state, it necessitates a pelletizing process.

As described in the foregoing, the properties of the catalytic components for $\alpha$-olefin polymerization manufactured by the methods of prior arts and those of the olefin polymers polymerized in the presence thereof are not satisfactory. Therefore, further improvement over these catalytic components has been desired.

SUMMARY OF THE INVENTION

In the Japanese patent application laid-open No. sho 54-40094, the Japanese patent application Nos. sho 53-76168 and 54-83220, the inventors of this invention formerly proposed methods for manufacturing the titanium trichloride catalytic component which can freely control the particle diameter thereof and therefore can freely control the particle diameter of the olefin polymer as desired, to thereby be possible to omit pelletizing process of the polymer product.

Furthermore, the inventor of this invention strenuously conducted studies for improvements of the above catalytic component to have led to the completion of the present invention.

It is therefore an object of this invention to provide a titanium trichloride catalytic component which is usable for polymerization of $\alpha$-olefin and which is prepared in such a manner that: In separating a titanium trichloride catalytic component from a solution obtained by dissolving titanium tetrachloride, an organic ether compound and an organo-aluminum compound in a solvent, a mixed solvent which consists of a saturated aliphatic hydrocarbon and/or an alicyclic hydracarbon with 20 to 70% by volume of an aromatic hydrocarbon halide allowed to be con-comitant therein is employed as the solvent. The organo-aluminum compound, the titanium tetrachloride and the organic ether compound is added to the mixed solvent at a solvent temperature lower than 55° C.

On the way of the solvent temperature being raised up to a temperature between 45° C. and 150° C., a temporary cooling process is repeated twice or more than twice, in the cooling process of which the solvent is temporarily cooled to a temperature lower than 40° C. when the temperature thereof reaches to 45°–80° C. and at the time of this cooling the organic ether compound and/or the titanium tetrachloride is further added, to thus make a titanium trichloride catalytic component of average particle diameter measuring 10 to 1000$\mu$ to be separated out through this process. This average particle diameter is adjustable as desired within the range from 10 to 1000$\mu$ and the $\alpha$-olefin polymerizing titanium trichloride catalytic component which is thus obtained has a high degree of activity and is capable of forming a stereospecific polymer at a high degree of productivity.

It is another object of the present invention to provide a method for homo or co-polymerization of $\alpha$-olefin in which the polymerization is carried out in the presence of this catalytic component to obtain a highly stereospecific polymer having a highly uniform particle diameter.

In accordance with this invention, it is mandatory that the solvent which is to be used for dissolving the titanium tetrachloride, the organic ether compound and the organo-aluminum compound therein is prepared by allowing an aromatic hydrocarbon halide to exist in the saturated aliphatic hydrocarbon and/or the alicyclic hydrocarbon. It is by this arrangement that the particle diameter of the titanium trichloride catalytic component to be obtained can be adjusted as desired. If the solvent consists of only the saturated aliphatic hydrocarbon and/or the alicyclic hydrocarbon without having the aromatic hydrocarbon halide mixed therein or, conversely, if the solvent consists of only the aromatic hydrocarbon halide, there would be produced a titanium trichloride catalytic component of extremely fine particle size with which the object and the advantageous effects of the present invention hardly can be attained and which is hardly usable as catalytic component for polymerization of α-olefin.

This fact is an amazing discovery which has never been anticipated by known prior arts and the present invention is of gret significance for industrial applications. The titanium trichloride catalytic component has a high degree of activity and also has a high productivity for a stereospecific polymer, so that the deashing and washing process can be either omitted or simplified. Besides, the titanium trichloride catalytic component obtained in accordance with this invention and a polymer obtained from the use of this catalytic component have uniform particle diameter respecitvely. A further advantage of the invention lies in that the particle diameter is adjustable as desired, so that the properties such as fluidity can be adjusted to be suitable for use at any types of plants. It is another advantageous feature of the invention that the adjustability of the polymer product to any desired particle diameter makes it possible to omit a pelletizing process.

In accordance with the present invention, the halogen of the aromatic hydrocarbon halide to be used is selected out of the group consisting of chlorine, bromine, iodine and fluorine. taking chlorinated aromatic hydrocarbons and brominated aromatic hydrocarbons and bromonated aromatic hydrocarbons as examples, the aromatic hydrocarbon halide may be selected out of the group including chlorinated aromatic hydrocarbons such as chloro-benzene, chloro-toluene, chloro-xylene, chloro-ethyl benzene, dichloro-benzene, dichloro-toluene, dischloro-xylene, trichloro-benzene, trichloro-toluene, chlorobromo-benzene, etc. and brominated aromatic hydrocarbons such as bromo-benzene, bromo-toluene, bromo-xylene, bromo-ethyl benzene, dibromo-benzene, dibromo-toluene, dibromo-xylene, tribromo-benzene, tribromo-toluene, etc. Of these chlorinated and brominated aromatic hydrocarbons, it is preferable to use chloro-benzene, chloro-toluene, chloro-xylene, dichloro-benzene, dichloro-xylene, bromo-benzene, bromo-toluene, bromo-xylene, dibromo-benzene, dibromo-toluene, dibromo-xylene, etc.

The saturated aliphatic hydrocarbon to be employed in accordance with this invention is preferably a compound having a boiling point at 65° C. and above. For example, the saturated aliphatic hydrocarbon may be selected out of the group consisting of n-heptane and n-decane. The alicyclic hydro-carbon preferably has a boiling point at 65° C. and above and may be selected, for example, out of the group consisting of cyclo-hexane, cyclo-heptane, cyclo-octane, methylcyclo-hexane, etc.

In an example of methods for adjustment of the particle diameter of the titanium trichloride catalytic component, with an aromatic hydrocarbon halide arranged to be included in the saturated aliphatic hydrocarbon and/or alicyclic hydrocarbon (hereinafter will be called the mixed solvent), the particle diameter is controlled as desired by adjusting the concentration of the aromatic hydrocarbon halide in the mixed solvent.

The concentration of the aromatic hydrocarbon halide in the mixed solvent is 20 to 70% by volume, preferably 25 to 65% by volume and more preferably 30 to 60% by volume. Within this range of concentration, the particle diameter of the titanium trichloride to be produced becomes smaller according as the concentration of the aromatic hydrocarbon halide increases and, conversely, becomes larger according as the concentration decreases. With the concentration less than 20% by volume, for example, the particle diameter of the titanium trichloride catalytic component becomes uneven and the polymerizing activity of the catalytic component and the sterospecificity of the polymer to be obtained therefrom are extremely lowered. On the other hand, when the concentration exceeds 70% by volume, the particle diameter of the catalytic component becomes so small that filtration and washing of the titanium trichloride catalytic component thus obtained become difficult and this results in lowered productivity for the catalytic component.

The titanium tetrachloride is used in the ratio of 5 mol and less to 1 liter of the mixed solvent, preferably 2 mol and less and more preferably 1.5 mol and less. There is no particular limination to the lower limit value for the titanium tetrachloride. However, for the productivity for the titanium trichloride catalytic component, it is preferable to set the lower limit of the ratio at 0.01 mol.

The organic ether compound to be used in accordance with this invention is preferably a compound that is expressed by a generic formula ROR', wherein R and R' represent alkyl groups which are the same or different from each other with at least one of them having a carbon number not exceeding 5. The compound is selected out of the group consisting of di-n-anyl ether, di-n-propyl ether, n-amyl-n-bytyl ether, n-amyl isobutyl ether, n-butyl-n-propyl ether, n-butyl isoamyl ether n-propyl-n-hexyl ether, n-butyl-n-octyl ether, etc. Of these compounds, the use of di-n-butyl ether brings about the best result. The organic ether compound to be dissolved in the mixed solvent is used in quantity 0.8 to 3 mol for 1 mol of the titanium tetrachloride and preferably 1 to 2.5 mol. If less than 0.8 mol of the organic ether compound is used for 1 mol of the titanium tetrachloride, the polymerizing activity of the titanium trichloride catalytic component thus produced would decrease and the productivity thereof for a stereospecific polymer would be lowered. Conversely, if the quantity of the organic ether compound exceeds 3 mol, not only the yield of the catalytic component would be lowered but the polymerization activity and the stereospecific polymer productivity of the catalytic component would also decrease.

As for the organo-aluminum compound to be used in aaccordance with this invention, a compound that is expressed by a generic formula of $AlR_nX_{3-n}$, wherein R represents and alkyl group having a carbon number 1-10, X a halogen or hydrogen atom and n a real number of $0 < n \leq 3$, is usable as organo-aluminum compound of the invention. The organo-aluminum compound in which, for example, n=3 may be selected from the group consisting of trimethyl aluminum, triethyl aluminum, tri-n-propyl aluminum, tri-n-butyl aluminum, triisobutyl aluminum, tri-n-pentyl aluminum, tri-n-hexyl aluminum, triisohexyl aluminum, tri-octyl aluminum, etc. The compound in which X is a hydrogen atom may be selected out of the group consisting of dimethyl aluminum hydride, methyl aluminum dihydride, diethyl aluminum hydride, ethyl aluminum dihydride, di-n-butyl aluminum hydride, n-butyl aluminum dihydride, diisobutyl aluminum hydride, isobutyl aluminum dihydride, di-n-pentyl aluminum dihydride, di-n-hexyl aluminum hydride, diisohexyl aluminum hydride, di-n-octyl aluminum hydride, etc. The compound in which X is a halogen atom may be selected for example out of chlorides such as dimethyl aluminum chloride, diethyl aluminum chloride, di-n-propyl aluminum chloride, di-n-butyl aluminum chloride, diisobutyl aluminum chloride, di-n-pentyl aluminum chloride, di-n-hexyl aluminum chloride, diisohexyl aluminum chloride, di-n-octyl aluminum chloride, di-n-octyl aluminum chloride, methyl aluminum sesqui-chloride, ethyl aluminum sesqui-chloride, n-propyl aluminum sesqui-chloride, n-butyl aluminum dichloride, isobutyl aluminum dichloride, n-hexyl aluminum dichloride, isohexyl aluminum dichloride, etc. The organo-aluminum compound may be diluted to a suitable degree with an aromatic hydrocarbon such as benzene, toluene, xylene, etc., or with the aromatic hydrocarbon halide, the saturated aliphatic hydrocarbon or the alicyclic hydrocarbon which is used for the preparation of the mixed solvent in accordance with the invention, or with a mixture of them. The organo-aluminum compound is used for the purpose of reducing a tetravalent titanium. Theoretically, addition of the organo-aluminum compound in quantity equivalent to the tetravalent titanium suffices. However, in the presence of the aromatic hydrocarbon halide, the addition quantity of the organo-aluminum compound is also interrelated with the particle diameter of the titanium trichloride catalytic component to be obtained. It is, therefore, preferable to add the organo-aluminum compound in quantity 0.3 to 1.8 equivalent of the titanium tetrachloride. If the organo-aluminum compound is added in quantity less than 0.3 equivalent of the titanium tetrachloride, the yield rate of the titanium trichloride catalytic component decreases to a great degree. Conversely, addition quantity exceeding 1.8 equivalent of the titanium tetrachloride lowers the polymerization activity and the stereospecifi polymer productivity. Further, within this range of addition quantity of the organo-aluminum compound, the particle diameter of the catalytic component decreases as the addition quantity increases.

In another method for adjusting the particle diameter of the titanium trichloride catalytic component, the particle diameter also can be controlled by adjusting the composition of the organic ether compound-titanium tetrachloride-organo-aluminum compound system. However, this method also requires the presence of the aromatic hydrocarbon halide. Otherwise, the adjustment of the particle diameter of the titanium trichloride catalytic component is impossible. For example, in cases where the concentrations of the organic ether compound and the titanium tetrachloride are fixed, the particle diameter of the catalytic component thus obtained decreases as the concentration of the organo-aluminum compound increases. If the concentrations of the titanium tetrachloride and the organo-aluminum compound are fixed, the particle diameter of the catalytic component decreases as the concentration of the organic ether compound increases.

As for the organic ether compound to be added during the at the time of temporary cooling on the way of the temperature raising process in accordance with this invention, the desired effect of this addition can be attained by the use of any of the organic ether compounds mentioned in the foregoing. Then, the addition quantity of the organic ether compound is less than 4 mol for 1 mol of the titanium tetrachloride included in the mixed solution, preferably less than 3.5 mol and more preferably less than 2.4 mol. If the addition quantity exceeds 4 mol, there takes place flocculation between particles to form a coarse coagulative titanium trichloride catalytic component, which has a lower effect as catalytic component for polymerization of α-olefin. There is no lower limit to the additon quantity. However, no salient effect can be expected from addition quantity less than 0.01 mol.

As regards other matters to be added besides the above stated organic ether compound during the temperature raising process at the time of temporary cooling on the way of the temperature raising process, titanium tetrachloride is also added either alone or in a state of being mixed with the organic ether compound or in the form of a complex compound consisted of the two.

The addition quantity of the above stated titanium tetrachloride to be added in the temperature raising process in accordance with the present invention is at least 0.01 mol for 1 mol of the titanium tetrachloride which is included in the mixed solution, preferably more than 0.02 mol and more preferably more than 0.04 mol. If the addition quantity is less than 0.01 mol, the polymer would lack transparency.

The above stated complex consisting of an organic ether compound and titanium tetrachloride may be selected out of combinations of tianium tetrachloride and diethyl ether, titanium tetrachloride and di-n-propyl ether, titanium tetrachloride and di-n-butyl ether, titanium tetrachloride and diisoamyl ether, titanium tetrachloride and isoamyl-n-butyl ether, etc.

The above stated mixture or comples is added in quantity equivalent to the solo addition quantity of the above stated organic ether compound or the titanium tetrachloride. In accordance with this invention, the time at which the organic ether compound, titanium tetrachloride or a mixture or complex consisted of the organic ether compound and titanium tetrachloride is added in the temporary cooling process is as follows: After the total quantity of the organo-aluminum compound is added at a solvent temperature not exceeding 55° C. in the presence of 20 to 70% by volume of the concomitant aromatic hydrocarbon halide in the mixed solvent and then the solvent temperature is raised up to a value between 45° and 80° C., a slurry thus produced is temporarily cooled to lower than 40° C. At this temporary cooling time, the said reagents are added.

In an example of manufacturing processes, the titanium trichloride catalytic component of the present invention is obtained through the following procedures: The titanium tetrachloride and the organic ether compound are dissolved in the mixed solvent either separately or in the form of a mixture or a complex. Following this, total amount of the organo-aluminum compound is added therein. In dissolving the organo-aluminum compound, the temperature of the mixed solvent should be arranged to be below 55° C., preferably below 50° C. and more preferably below 45° C. If the organo-aluminum compound is added a solvent temperature exceeding 55° C., the titanium tetrachloride would be immediately reduced to separate out a titanium trichloride catalytic component in a state of fine particles. This not only would make adjustment of the particle diameter of the titanium trichloride catalytic component difficult but also would make difficulties for filtration and washing thereof and thus would result in lowered productivity.

After addition of the organo-aluminum compound, the temperature of the solvent is raised up to 45°–80° C. for 5 minutes–12 hours, preferably 45°–75° C. for 10 minutes–12 hours, especially preferably 50°–70° C. for 10 minutes–4 hours. After then, a slurry thus produced is temporarily cooled to bellow 40° C. After this cooling, the organic ether compound and/or titanium tetrachloride is added.

In the temporary cooling process, which is carried out afterwards, the same procedure as mentioned above is repeated. That is, 1st procedure for raising up the temperature of the solvent to 45°–80° C. for 5 minutes–12 hours, 2nd procedure for cooling a slurry thus produced to below 40° C., 3rd procedure for adding the organic ether compound and/or titanium trichloride.

Afterwards, temperature of the mixed solvent is raised up to a temperature between 45° and 150° C., preferably between 65° and 120° C. and more preferably between 75° and 110° C. The length of time required for raising the temperature up to the prescribed value ranges from 10 minutes to 24 hours, preferably from 30 min. to 12 hours and more preferably from 1 to 8 hours, though it depends upon difference between the temperature values before and after the temperature raising process. These processes are carried out for the purpose of reducing the titanium tetrachloride with the organo-aluminum compound to obtain the titanium trichloride catalytic component of highly uniform particle diameter. If the temperature is too quickly raised in a short period of time, say, less than 5 minutes from the temperature at which the organo-aluminum compound is added, the particle diameter of the titanium trichloride catalytic component would become uneven. Conversely, even if the temperature is too slowly raised over a long period of time, say, exceeding 24 hours, the process would not bring about any greater effect. On the other hand, if the temperature is raised up to a value less than 45° C., the reduction reaction would take place at a slow velocity, which would result in a poor productivity. However, the upper limit of the raised temperature must be determined at a temperature lower than the boiling point of the compound that has the lowest boiling point among the saturated aliphatic hydrocarbon or alicyclic hydrocarbon and the aromatic hydrocarbon halide employed. The upper limit is thus normally set at 150° C.

After completion of the temperature raising process, it is preferable to retain the raised temperature for a period of time between several minutes and several ten minutes to ensure complex tion of the reducing reaction, but this procedure is not indispensable.

Through the above stated process, it is possible to obtain a novel titanium trichloride catalytic component having a true spherical shape and highly uniform particle diameter which is adjustable as desired within the range from 10 to 1000$\mu$. The catalytic component thus obtained is thoroughly washed with either a hydrocarbon solvent or an aromatic hydrocarbon halide solvent. After washing, the catalytic component can be stored either in a slurry-like state or in a dried state through filtration and drying processes.

This invention relates to a improvement for the methods in the Japanese patent application laid-open No. 54-90094 and the Japanese patent application No. 53-76168 which the inventors of the present application developed.

Compared with the two methods applied forwerly, the method of this invention is characterized in that polymerization activity etc. of titanium trichloride catalytic component and bulk density of produced polymer can be improved.

The titanium trichloride catalytic component is used to form an $\alpha$-olefin polymerizing catalyst system in combination with an organo-aluminum compound expressed by a generic formula of $AlR_nX_{3-n}$ wherein R represents an alkyl group, X a halogen atom and n a real number of $0 < n \leq 3$. The organo-aluminum compound may be selected out of the group consisting of triethyl aluminum chloride, diethyl aluminum chloride, ethyl aluminum dichloride, ethyl aluminum sesqui-chloride, triisobutyl aluminum, diisobutyl aluminum chloride, etc.

The quantitative ratio of the titanium trichloride catalytic component to the organo-aluminum compound can be determined as desired within a wide range by those skilled in the art. Normally, however, the mole ratio is between 1:1 and 1:20. Further, in carrying out the $\alpha$-olefin polymerizing method of this invention, the catalyst system may be used in combination with an electron donor of the kind generally employed.

The polymerization may be carried out by a suspension polymerization process in which an inert hydrocarbon selected from the group consisting of an aromatic hydrocarbon such as benzene, toluene, exylene, etc., or an aliphatic hydrocarbon such as heptane, hexane, octane, etc. or an alicyclic hydrocarbon such as cyclohexane, cyclo-heptane, etc. is employed as solvent; by a liquid phase polymerization process in which a liquefied monomer is employed as solvent; or by a gas phase polymerization process in which a monomer is used in a gas phase. As for the mode of carrying out the polymerization, either a continuous processing mode or a batch processing mode can be adoped. Polymerization temperature is set between 30° and 120° C. and preferably between 50° and 100° C. while polymerization pressure is set between atmospheric pressure and 50 atm.

The $\alpha$-olefin to be homo- or co-polymerized by the catalyst system of the present invention includes ethylene, propylene, butene-1, 4-methyl pentene, etc. The molecular weight of the polymer can be adjusted by a known method of using hydrogen or diethyl zinc.

When the titanium trichloride catalytic component is used for polymerization of the $\alpha$-olefin in accordance with the polymerization method of this invention, the polymerizing activity of the catalytic component is very high. The polymer thus obtained has high stereo-specificity and high bulk density. With the particle diameter of the titanium trichloride catalytic component suitably adjusted, a polymer product having highly uniform particle diameter measuring within the range from 0.5 to 15 mm can be obtained. The polymer is of an approximately true spherical shape having a good fluidity and, despite of its large particle diameter, also has a good deashing property.

The objects, features and advantages of the invention will appear more fully hereinafter from the following description of embodiments thereof.

PREFERRED EMBODIMENTS OF THE INVENTION

The invention will be more clearly understood from the following description of embodiment examples. However, it is to be understood that the scope of the invention is not limited to these embodiment examples. Further, the symbols used for description of these embodiment examples and comparison examples denote the following:

a: The number of grams (g-pp) of the polymer produced within a unit period of time (hr), at a unit pressure (atm), per gram (g-cut) of the catalytic component (g-pp/g-cat, hr-atm).

H.I.: A boiling n-heptane insoluble component $$\frac{\text{in solid polymer produced (g)}}{\text{Solid polymer produced (g)}} \times 100(\%)$$

$$I.I.: \frac{\text{Solid polymer produced (g)} \times H.I.}{\text{Solid polymer produced (g)} + \text{polymer soluble in polymerization solvent}} (\%)$$

Dc: Average particle diameter value ($\mu$) obtained by measuring, with a microscope, the diameter of 50 particles of each of the titanium trichloride catalytic component and the polymer.

p: The bulk density (g/ml) of the solid polymer product as measured by Method A or B of ASTM-D-1895-69.

Dp: The geometrical average diameter of the polymer product in a logarithmic probability distribution formula.

EMBODIMENT EXAMPLE 1

Preparation of the Titanium Trichloride Catalystic Component

A four-neck 500 ml flask provided with a stirrer was flushed with dry nitrogen gas.

Following this, 250 ml of a mixed solvent consisted of monochlorobenzene (30% by volume) as a halogenated aromatic hydrocarbon and n-hexane, was introduced into the flask, and then 24.2 ml of titanium tetrachloride was added to form a mixed solution.

Said mixed solution was kept at temperature of 20°–23° C. and stirred while 55.6 ml of di-n-butyl ether was added thereto dropwise over a period of 10 minutes. Following this, 18.8 ml of diethylaluminum chloride was added dropwise over a period of 40 minutes.

After the mixed solution was prepared as above-mentioned, a temporary cooling step or process was carried out twice as recited below.

Said mixed solution was heated so that the temperature thereof increased at a rate of about 1° C. at every 2.2 minutes.

When the temperature thereof reached to 60° C., heating was discontinued and the system was immediately cooled to 20° C. 12.2 ml of di-n-butyl ether and 5.0 ml of titanium tetrachloride were added to the cooled system and the resulting mixture was stirred, and then heated so that the temperature thereof increased at a rate of about 1° C. every 1.5 minutes. When the temperature of the system reached 60° C., heating was again discontinued, and the mixture was immediately cooled to 20° C. Then a further 12.2 ml portion of di-n-butyl ether and a 5.0 ml portion of titanium tetrachloride were added and the resulting mixture was stirred. Heating was resumed and the temperature of the mixture was raised to 80° C. while regulating the heating so that the temperature increased at a rate of about 1° C. every 1.5 minutes. The titanium trichloride catalytic component was allowed to precipitate, and to make the precipitation thereof complete, the system (a mixed solution) was maintained at 80° C. for 60 minutes.

At the end of said 60 minutes the precipitate was filtered in an at atmosphere of dry nitrogen gas, and the filtered mass-like precipitate was washed twice with 100 ml of monochlorobenzene and three times by 200 ml of n-hexane, respectively. After washing, the precipitate was dried under reduced pressure at room temperature. 41.4 g of particulate titanium trichloride catalytic component having an average particle diameter of 40$\mu$ was obtained. Said particles had a uniform particle diameter. The titanium trichloride catalytic component obtained, was found, by analysis, to contain 25.8 wt % of Ti, 60.7 wt % of Cl, 0.2, wt % of Al and 9.1 wt % of di-n-butylether. The specific surface area of the catalytic component was 129 m$^2$/g, as measured by the BET method.

Polymerization Procedure

A one-liter polymerization flask provided with side arm, was dried (by removing water) and flushed with dry nitrogen gas. Then 400 ml of n-heptane, 108 mg of said titanium trichloride catalytic component and 1.6 m mol of diethylaluminum chloride were charged into the flask.

Then the nitrogen gas inside the polymerization flask was replaced with propylene, and the polymerization of propylene was carried out for 2.5 hours, maintaining the inside pressure of the flask at 2 kg/cm$^2$G.

After completion of the polymerization, stirring and charging of propylene were discontinued, and unreacted propylene was purged from the system.

Subsequently, a mixed alcohol consisted of methanol and isoproanol (3:1 ratio) was added to the flask to decompose the catalyst.

The prepared solid polymer was separated by filtration, washed and dried. 67.2 g of polypropylene was obtained.

The filtrate (filtered liquid) was dried by evaporation, and polypropylene dissolved therein was recovered. The results obtained are reported in Table 1.

EMBODIMENT EXAMPLE 2

In accordance with the method of embodiment Example 1, the above-mentioned temporary cooling step was carried out three times, and 8.0 ml of di-n-butyl ether and 3.5 ml of titanium tetrachloride were respectively added at each of the temporary cooling steps. Except for said three temporary cooling steps (instead of two) and the amounts of said ether and titanium tetrachloride added, the titanium trichloride catalytic component was prepared and polymerization of propylene was carried out as in embodiment Example 1. The result obtained are reported in Table 1.

EMBODIMENT EXAMPLE 3

In accordance with embodiment Example 1, the above-mentioned temporary cooling step was carried out four times and 6.0 ml of di-n-butyl ether and 2.5 ml of titanium tetrachloride were respectively added at each of the temporary cooling steps. Except for said four temporary cooling steps (instead of two), and the amounts of said ether and titanium tetrachloride added, the titanium trichloride catalytic component was prepared and polymerization of propylene was carried out as in embodiment Example 1. The result obtained is reported in Table 1.

COMPARATIVE EXAMPLE 1

Preparation of the Titanium Trichloride Catalytic Component

A four-necked flask of 500 ml volume equipped with a stirrer was flushed with dry nitrogen gas. Then, 250 ml of a mixed solvent consisted of monochloro-benzene (30% by volume) as a halogenated aromatic hydrocarbon and n-hexane was introduced into the flask; then 24.2 ml of titanium tetrachloride was added to form a mixed solution.

The mixed solution was kept at temperature of 20°-23° C. and stirred while 55.6 ml of di-n-butyl ether was added thereto in a dropwise manner over a period of ten minutes, and after adding said ether, 18.8 ml of diethylaluminum chloride was added in dropwise manner over a period of 40 minutes. After adding the diethylaluminum chloride, the temperature of the resulting mixed solution was raised to 80° C. over a period of 2.5 hours. As the temperature was raised, the titanium trichloride catalytic component separated out. The mixture was kept at 80° C. for 60 minutes to complete the precipitation of the titanium trichloride catalytic component. The precipitate was filtered immediately under an atmosphere of dry nitrogen, and the filtered mass-like precipitate was washed twice by 100 ml of monochlorobenzene and three times by 200 ml of n-heptane, respectively.

After washing, the precipitate was dried under reduced pressure in room temperature, so that 35 g of titanium trichloride catalytic component having an average particle diameter of 50$\mu$ was obtained.

The titanium trichloride catalytic component obtained was found, by analysis, to contain 27.6 wt % of Ti, 60.9 wt % of Cl, 0.19 wt % of Al and 8.4 wt % of di-n-butylether. The specific surface area of the catalytic component was 125 m$^2$/g, as measured by the BET method.

Polymerization Procedure

Using this titanium trichloride catalytic component, propylene was polymerized by the same procedure as in the polymerization method of embodiment Example 1. The results obtained are reported in Table 1.

COMPARATIVE EXAMPLE 2

Preparation of the titanium trichloride catalytic component

The inside of a four-necked flask of 500 ml equipped with a stirrer was replaced with dry nitrogen gas. Then 250 ml of a mixed solvent consisted of monochlorobenzene as a halogenated aromatic hydrocarbon and n-hexane, wherein monochlorobenzene was 30% by volume in whole, was introduced into the flask, and further 24.2 ml of titanium tetrachloride was added. The mixed solution was kept at temperature of 20°-23° C. and under stirring 55.6 ml of di-n-butylether was added in dropwise for 10 minutes to the solution.

After this adding, further 18.8 ml of diethyl aluminum chloride was added in dropwise for 40 minutes.

After the mixed solution was prepared as mentioned above, the temparary cooling process was practised as hereinafter. The mixed solution was heated sothat the average velocity of raising the temperature thereof was 1° C. at every about 2.2 minutes. When the temperature thereof reached to 60° C., heating the mixed solution was stopped and immediately was cooled to 20° C., and 24.2 ml of di-n-butylether and 10 ml of titanium tetrachloride were again added to the mixed solution, being followed with enough mixing under stirring.

Afterwards, the mixed solution was heated and the temperature thereof was raised up to 70° C., regulating heating thereof sothat the average velocity of raising temperature was 1° C. every about 1.5 minutes.

Thus the titanium trichloride catalytic component was allowed to precipitate, and to complete the precipitation thereof perfectly, the mixed solution was further maintained at 70° C. for 60 minutes, after the temperature raising.

After-wards, immediately the precipitate was filtered in an atmosphere of dry nitrogen gas, and the filtered mass-like precipitate was washed twice by 100 ml of monochlorobenzene and three times by 200 ml of n-hexane respectively.

After washing, the precipitate was dried under reduced pressure at room temperature, sothat 42.0 g of titanium trichloride catalytic component having average particle diameter of 40$\mu$ was obtained, which particles were excellent in uniformity of particle diameter.

As the result of analysing the titanium trichloride catalytic component obtained, it was recognized to contain 26.3 wt % of ti, 62.4 wt % of Cl, 0.2 wt % of Al and 8.9 wt % of di-n-butylether.

The specific surface area of the catalytic component was 120 m$^2$/g, as measured by the BET method.

Polymerization Procedure

Using this titanium trichloride, propylene was polymerized by the procedure as same as in the polymerization method of embodiment example 1.

The result thereof was described in Table 1.

TABLE 1

| No. of embodiment example or comparative example | Dc | a | I.I. | p | Dp |
|---|---|---|---|---|---|
| embodiment example 1 | 40 | 91 | 97.6 | 0.46 | 580 |
| embodiment example 2 | 40 | 93 | 97.5 | 0.46 | 580 |
| embodiment example 3 | 40 | 92 | 97.6 | 0.47 | 570 |
| comparative example 1 | 50 | 75 | 91.2 | 0.32 | 620 |
| comparative example 2 | 40 | 83 | 94.0 | 0.43 | 560 |

EMBODIMENT EXAMPLE 4-19

The kind, mixed ratio and used amount of the mixed solvent, the kind and used amount of the ether, and the kind and used amount of the organo-aluminum compound were as described in Table 2.

Except the above conditions, preparation of titanium trichloride catalytic component and polymerization of propylene were carried out in exactly the same manner as in Embodiment Example 1 respectively.

The result thereof was described in Table 2.

TABLE 2

| Embodiment Example | preparation of catalyst mixed ratio and total amount of mixed solvent | | preparation of catalyst name and amount of ether | preparation of catalyst name and amount of organo-aluminum compound | result of polymerization | | | | |
|---|---|---|---|---|---|---|---|---|---|
| | | | | | Dc | a | I.I. | Dp | p |
| 1 | MCB*1:hexane (3:7) | 250ml | DNBE*2 0.30 | DEAC*3 0.15 | 80 | 88 | 96.0 | 780 | 0.44 |
| 5 | MCB*1:hexane (3:7) | 300ml | DNBE 0.32 | DEAC 0.15 | 15 | 90 | 96.3 | 100 | 0.42 |
| 6 | MCB*1:hexane (3:7) | 250ml | DNBE 0.33 | DEAC 0.17 | 110 | 85 | 95.5 | 1,200 | 0.43 |
| 7 | MCB*1:hexane (3:7) | 250ml | DNBE 0.30 | DEAC 0.17 | 220 | 84 | 94.0 | 1,500 | 0.37 |
| 8 | MCB:hexane (1:3) | 200ml | DNBE 0.32 | DEAC 0.15 | 50 | 93 | 98.2 | 620 | 0.44 |
| 9 | MCB:hexane (1:4) | 200ml | DNBE 0.33 | DEAC 0.15 | 80 | 91 | 97.5 | 960 | 0.45 |
| 10 | MCB:hexane (1:4) | | DNBE 0.28 | DEAC 0.16 | 410 | 75 | 93.4 | 2,600 | 0.35 |
| 11 | MCB:heptane (4:8.5) | 250ml | " | " | 50 | 92 | 98.0 | 620 | 0.46 |
| 12 | MCB:cyclohexane (3:7) | 250ml | " | " | 70 | 90 | 96.5 | 700 | 0.47 |
| 13 | ortho-chlorotoluene:hexane (3:7) | 250ml | " | " | 55 | 91 | 95.1 | 640 | 0.46 |
| 14 | bromotoluene:hexane (3:7) | 250ml | " | " | 45 | 89 | 94.8 | 610 | 0.45 |
| 15 | iodobenzene:hexane (3:7) | 250ml | " | " | 45 | 85 | 94.5 | 600 | 0.46 |
| 16 | MCB:hexane (3:7) | 250ml | " | DIBAC*4 0.15 | 50 | 92 | 97.5 | 630 | 0.45 |
| 17 | MCB:hexane (3:7) | 250ml | " | DNPRAC*5 0.15 | 45 | 93 | 97.0 | 620 | 0.44 |
| 18 | MCB:hexane (3:7) | 250ml | di-n-propylether 0.32 | DEAC 0.15 | 55 | 92 | 96.6 | 630 | 0.40 |
| 19 | MCB:hexane (3:7) | 250ml | di-n-amylether 0.32 | DEAC 0.15 | 50 | 90 | 95.8 | 620 | 0.46 |

*1 monochlorobenzene
*2 di-n-butylether
*3 diethylaluminum chloride
*4 diisobutylaluminum chloride
*5 di-n-propyl aluminum chloride

What is claimed is:

1. A titanium trichloride catalytic component for polymerization of α-olefin obtained in the following manner: separating said titanium trichloride catalytic component from a solution prepared by dissolving titanium tetrachloride, an organic ether compound and an organo-aluminum compound in a solvent, said solvent being a mixed solvent prepared by mixing 20 to 70% by volume of an aromatic hydrocarbon halide with a solvent consisting of saturated aliphatic hydrocarbon and/or alicyclic hydrocarbon; said organo-aluminum compound, said titanium tetrachloride and said organic ether compound being added to said mixed solvent at a solvent temperature not exceeding 55° C. and then, while raising the temperature of the resulting solution to a value between 45° and 150° C. said temperature is temporarily lowered by cooling to below 40° C.; and, at the time of cooling said solution the organic ether compound and/or titanium tetrachloride is further added; wherein the temporary cooling step is repeated at least twice to allow titanium trichloride catalytic component having an average particle diameter between 10 and 1000μ to separate out of said solution.

2. A titanium trichloride catalytic component according to claim 1, wherein said organic ether compound added at the time of temporary cooling is a mixture or a complex consisting of an organic ether compound and titanium tetrachloride.

3. A titanium trichloride catalytic component according to claim 1 or 2, wherein said aromatic hydrocarbon halide is an aromatic hydrocarbon chloride and/or an aromatic hydrocarbon bromide.

4. A titanium trichloride catalytic component according to claim 1, wherein said organic ether compound is a compound expressed by a generic formula ROR', in which R and R' represent the same or different alkyl groups, at least one of said alkyl groups having a carbon number not exceeding 5.

5. A titanium trichloride catalytic component according to claim 1, wherein said organo-aluminum compound is a compound having the generic formula of $AlR_nX_{3-n}$ in which R represents an alkyl group having a carbon number between 1 and 10, X a halogen or hydrogen atom and n a real number of $0 < n \leq 3$.

6. A titanium trichloride catalytic component according to claim 1, wherein said saturated aliphatic hydrocarbon has a boiling point of at least 65° C.

7. A titanium trichloride catalytic component according to claim 1, wherein said alicyclic hydrocarbon has a boiling point of at least 65° C.

8. A titanium trichloride catalytic component according to claim 1, wherein said titanium tetrachloride is dissolved in said mixed solvent in a quantity not exceeding 5 mol per liter of said mixed solvent; said organic ether compound is dissolved therein in a quantity of 0.8 to 3 mol per mol of said titanium tetrachloride; and said organo-aluminum compound is dissolved therein in quantity of 0.3 to 1.8 equivalent per mol of said titanium tetrachloride.

9. A titanium trichloride catalytic component according to claim 1, wherein the total amount of the organic ether compound to be added at the time of temporary cooling does not exceed 4 mol per mol of said titanium tetrachloride in said mixed solvent.

10. A titanium trichloride catalytic component according to claim 1, wherein the total amount of titanium tetrachloride to be added at the time of temporary cooling is at least 0.01 mol per mol of said titanium tetrachloride in said mixed solvent.

11. A titanium trichloride catalytic component according to claim 1, wherein the amount of titanium tetrachloride to be added at the time of temporary cooling in the form of a mixture or a complex in combination with an organic ether compound is at least 0.01 mol per mol of said titanium tetrachloride in said solvent.

* * * * *